May 5, 1936.　　　　G. L. COTTER　　　　2,039,705
BRAKE AND DOOR INTERLOCK DEVICE
Filed July 29, 1933
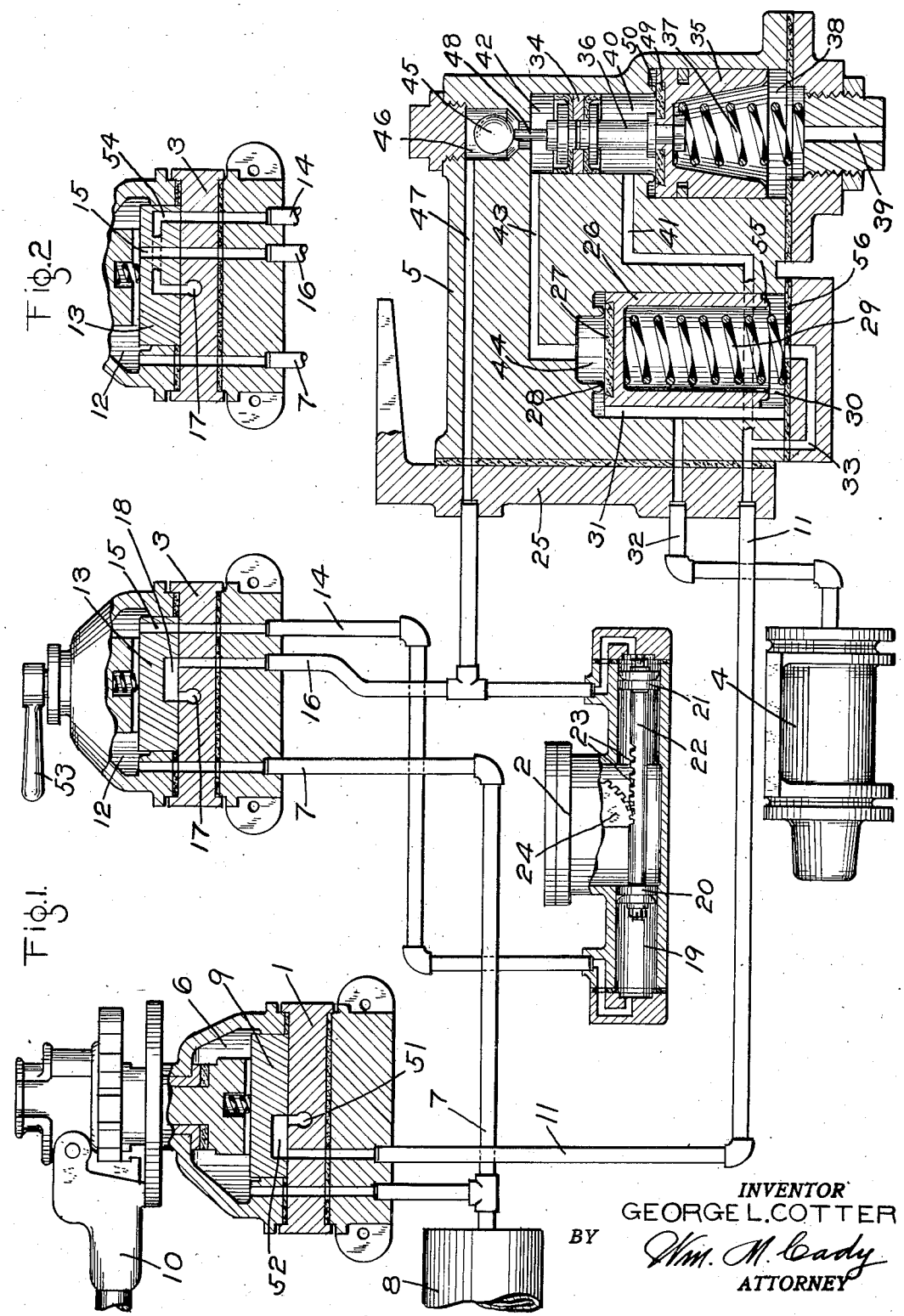
INVENTOR
GEORGE L. COTTER
BY
　*Wm. M. Cady*
ATTORNEY Patented May 5, 1936

2,039,705

UNITED STATES PATENT OFFICE 2,039,705

BRAKE AND DOOR INTERLOCK DEVICE

George L. Cotter, Wilkinsburg, Pa., assignor to The Westinghouse Air Brake Company, Wilmerding, Pa., a corporation of Pennsylvania Application July 29, 1933, Serial No. 682,758

9 Claims. (Cl. 303—6.1)

This invention relates to a fluid pressure brake and car door controlling equipment in which the operation of the car doors is interlocked with the operation of the brakes.

It has heretofore been proposed to provide an equipment of the above type in which the car doors cannot be opened until a full service application of the brakes has been effected. This results in the maximum brake cylinder pressure being present in the brake cylinder at the time the car doors are closed, so that considerable time is consumed in releasing the brakes before the car can be started. This also results in an unnecessary air consumption.

It has also been proposed to provide an equipment of the above type, in which means are provided for ensuring only that a predetermined pressure in the brake cylinder less than the maximum attainable is obtained when the apparatus is operated to effect the opening of the car doors, by supplying fluid under pressure to the brake cylinder in the door opening position until the brake cylinder pressure has been increased to a predetermined degree.

According to the principal feature of my invention, in addition to providing for ensuring that the brakes will be applied with a predetermined pressure when the car doors are opened, my improved equipment permits the operator to apply and release the brakes in the normal manner and if he applies the brakes as he should in bringing the car to a stop, the safety feature will not operate to supply additional fluid to the brake cylinder when the car doors are opened.

For example, if the operator has made a sufficient brake application to effect the stopping of the car, he may graduate the brake cylinder pressure off, as the car is brought nearly to a stop, so as to effect the desired smooth stopping of the car, so that the pressure in the brake cylinder when the car has stopped may be considerably lower than that at which the safety device is adjusted to operate, but if the operator has previously made a sufficiently powerful brake application, no additional fluid under pressure will be supplied to the brake cylinder, when the controlling valve is operated to open the car doors.

In the accompanying drawing; Fig. 1 is a diagrammatic view, mainly in section, of a combined brake and car door controlling equipment embodying my invention; and Fig. 2 a sectional view of the car door controlling valve device in the position for opening the car doors.

The equipment shown in Fig. 1 comprises a brake valve device 1, a door engine 2, a door controlling valve device 3, a brake cylinder 4, and a brake and door interlock valve device 5.

The brake valve device 1 comprises a casing having a valve chamber 6, connected by pipe 7 to a main reservoir 8 or other source of fluid pressure supply and containing a rotary valve 9 adapted to be operated by a handle 10 for controlling the supply of fluid under pressure to and its release from a straight air pipe 11.

The door controlling valve device 3 comprises a casing having a valve chamber 12 connected to main reservoir pipe 7 and containing a rotary valve 13 adapted in the door closed position, as shown in Fig. 1, to connect the door closing pipe 14 to valve chamber 12 by way of port 15 and the door opening pipe 16 to an atmospheric exhaust port 17, through cavity 18 in the rotary valve.

The door engine may be of the usual construction comprising a casing having a piston cylinder 19 in which is mounted pistons 20 and 21 connected together by a rod 22. The rod 22 is provided with rack teeth 23 adapted to engage the teeth of a gear segment 24, which segment is operatively connected up so as to operate the car doors. When the pistons 20 and 21 are in the position shown in Fig. 1, the car doors are held closed.

The brake and door interlock valve device 5 comprises a casing secured to a supporting bracket 25 and having mounted therein a cut-off valve piston 26 carrying at its upper face a seating gasket 27 adapted to engage a seat rib 28 and urged to this seating position by a coil spring 29 mounted in chamber 30 at the opposite side of the valve piston.

A passage 31 connects the area at the outer side of the seat rib 28 with chamber 30 and said passage is also connected to pipe 32, leading to the brake cylinder 4. Chamber 30 is connected to the straight air pipe 11 by way of passage 33.

Also mounted in the casing 5 is a valve device comprising pistons 34 and 35 connected together by a rod 36, the piston 35 being of greater area than piston 34 and being subject to the pressure of a coil spring 37 contained in chamber 38 at the lower face of the piston, said chamber being open to the atmosphere by way of port 39. As will be seen in the drawing the seat rib 50 engages the piston 35 at a point radially outwardly of the wall of the piston chamber in which the piston 34 is mounted, so that the area of the piston 35 which is exposed to the pressure of the fluid in the chamber 40 is greater than the area of the piston 34.

The chamber 40 intermediate the pistons 34 and 35 is connected to a passage 41, leading to the straight air pipe 11, and chamber 42 above the piston 34 is connected to a passage 43 leading to chamber 44 at the seated area of the valve piston 26.

In axial alinement with the piston assembly is a ball valve 45, which is contained in a valve chamber 46 connected through passage 47 with the door opening pipe 16. The valve 45 controls communication from chamber 46 to chamber 42 and is adapted to be operated by the pistons 34 and 35, through the stem 48, the valve 45 being normally held unseated by the piston 35 which is urged to this unseated position by spring 37. In this position, a seating gasket 49 on the piston 35 engages a seat rib 50.

In operation, with the car running along the road, the brake valve device 1 is in release position, as shown in Fig. 1, in which the straight air pipe 11 is connected to an atmospheric exhaust port 51, through cavity 52 in rotary valve 9. The door valve 3 is in door closed position, in which fluid under pressure is supplied through port 15 and the door closing pipe 14 to the chamber at the left of piston 20 of the door engine 2.

The piston 21 being connected to the atmosphere by way of door opening pipe 16, cavity 18 and exhaust port 17, the door engine will be maintained in its door closing position.

If it is desired to apply the brakes, the brake valve handle 10 is operated to turn the rotary valve 9 to a position in which fluid under pressure is supplied from the rotary valve chamber 6 and the main reservoir 8 to the straight air pipe 11. Fluid supplied to the straight air pipe flows to the brake cylinder by way of passage 33, chamber 30, passage 31 and pipe 32, so that the brakes are applied, and fluid supplied to the straight air pipe also flows through passage 41 to chamber 40, where it acts on the differential area of piston 35 since the exposed seated area of piston 35 is greater than the area of piston 34, as hereinbefore pointed out. If the pressure of fluid supplied to the straight air pipe and the brake cylinder exceeds the predetermined pressure for which the spring 37 is adjusted (for example 30 pounds), the piston 35 will be moved downwardly permitting the ball valve 45 to seat.

As soon as the piston 35 moves away from its upper seat, the full area of the piston is exposed to the fluid pressure acting in chamber 40, so that the piston will promptly move to its lower seat. By reason of the greater area of the piston 35 which is exposed to fluid pressure in its unseated position, it will be evident that the pressure in chamber 40 must reduce to a considerably lower degree than that required to unseat the piston, before the pressure of spring 37 will be sufficient to effect the movement of the piston to its upper seat, for example, while 30 pounds pressure may be required to unseat the piston, the pressure in chamber 40 may have to reduce to 10 pounds before the piston will be moved back to its upper seat.

As a result, if the operator, in bringing the car to a stop, has made a brake application of sufficient pressure, such as 30 pounds, to cause the piston 35 to move downwardly, and permit the ball valve to seat, then in order to make a smooth stop, he may graduate the brake cylinder pressure off, even as low as 10 pounds, and still the ball valve 45 will remain seated.

When the car has been brought to a stop and it is desired to open the car doors, the handle 53 of the door valve 3 is operated to rotate the valve 13 to its door opening position, as shown in Fig. 2, in which the door closing pipe 14 is connected to the atmospheric port 17, through cavity 54 in the rotary valve and the door opening pipe 16 is supplied with fluid under pressure by way of the port 15. The door engine piston assembly is then shifted to the door opening position by the fluid pressure supplied to the piston 21, so as to open the car doors.

If a predetermined brake cylinder pressure has been built up in the brake cylinder before the car doors are opened, the ball valve 45 will be seated, as hereinbefore described, so that flow of fluid from the door opening pipe past the ball valve is cut off. If, however, the piston 35 has not been previously operated to permit the ball valve to seat, fluid under pressure will then flow from the door opening pipe past the ball valve 45 to chamber 42 and thence through passage 43 to chamber 44. The main reservoir pressure supplied to the door opening pipe being higher than the brake cylinder pressure plus the pressure of spring 29 acting on the opposite side of the valve piston 26, the valve piston will be shifted from its upper seat, so as to permit flow of fluid from the door opening pipe to passage 31 and thence to the brake cylinder 4.

When the pressure of fluid supplied from the door opening pipe to the brake cylinder and acting in chamber 42 on the upper face of piston 34 is sufficient to overcome the pressure of spring 37, the piston 34 will be moved downwardly, permitting the ball valve 45 to seat.

The valve piston 26 is moved by the fluid pressure supplied to chamber 44 to its lower seat, in which a seat rib 55 on the valve piston engages a gasket 56, cutting off communication from the brake cylinder to the straight air pipe, so that if the brake valve should be turned to release position, fluid under pressure will not be exhausted from the brake cylinder by way of the brake valve.

If the pressure in the brake cylinder should reduce, the piston 34 will move up, due to the reduced pressure in chamber 42, and cause the ball valve 45 to be unseated, so that fluid under pressure is again supplied from the door opening pipe until the brake cylinder pressure has been restored to the predetermined degree, when the piston 34 will again be operated to permit the ball valve 45 to seat.

If it is desired to close the car doors and start the car, the door valve 3 is turned to the door closing position in which fluid under pressure is supplied to the door closing pipe 14 and fluid is vented from the door opening pipe.

When fluid is vented from the door opening pipe, the ball valve 45 will permit flow from the brake cylinder to the door opening pipe, until the pressure in chamber 44 has been reduced sufficiently to permit the valve piston 26 to be moved to its upper seat by the spring 29. In the upper seated position of the valve piston, the brake cylinder passage 31 is connected to the straight air pipe 11 by way of passage 33, so that the remaining fluid under pressure in the brake cylinder is vented to the atmosphere by way of the brake valve 1, if the same is in its release position.

It will thus be seen that with the above described equipment, if the operator manipulates the brakes as he is supposed to in bringing a car to a stop, even if the pressure in the brake cylinder is relatively low when the car is at a stop and the car doors are opened, additional unnecessary fluid under pressure will not be supplied to the brake cylinder, but on the other hand, if the controlling valve is operated to open the car doors and a sufficient brake application has not been previously effected, then the device will operate to supply fluid under pressure to the brake cylinder until a predetermined brake cylinder pressure has been obtained.

In addition, if the operator has previously made a sufficient application of the brakes, he can start to open the car doors early enough so that they will be open when the car stops, without causing a sudden and undesired increase in the braking force.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a door and brake controlling apparatus, the combination with a brake cylinder and manually operable means for controlling the supply and release of fluid under pressure to and from the brake cylinder and for the opening and closing of a car door, of a valve device controlling a communication through which fluid under pressure, supplied by operation of said manually operable means to open the car door, may be supplied to the brake cylinder, said valve device being operated upon a predetermined increase in the pressure of fluid supplied to the brake cylinder by operation of said manually operable means, for closing said communication, and means for preventing the movement of the valve device to open said communication until the brake cylinder pressure has been reduced substantially below the pressure at which the valve device is moved to closed position.

2. In a door and brake controlling apparatus, the combination with a brake cylinder and manually operable means for controlling the supply and release of fluid under pressure to and from the brake cylinder and for the opening and closing of a car door, of a valve device controlling a communication through which fluid under pressure, supplied by operation of said manually operable means to open the car door, may be supplied to the brake cylinder, said valve device comprising a valve for controlling said communication, a spring, and a piston subject to the opposing pressures of said spring, and the pressure of fluid supplied by said manually operable means to the brake cylinder, and operable to permit said valve to seat upon a predetermined increase in the pressure of fluid supplied to the brake cylinder, and means for preventing movement of said piston to unseat said valve until the pressure of fluid acting on said piston has been reduced substantially below the pressure of fluid required to operate the piston in effecting the seating of said valve.

3. In a door and brake controlling apparatus, the combination with a brake cylinder, a manually operable brake valve for controlling the supply and release of fluid under pressure to and from the brake cylinder, and a manually operable door valve for controlling the supply and release of fluid for opening and closing a car door, of a valve device controlling a communication through which fluid under pressure, supplied by operation of said door valve to open the car door, may be supplied to the brake cylinder, said valve device being operated upon a predetermined increase in the pressure of fluid supplied to the brake cylinder by operation of said brake valve device for positively closing said communication.

4. In a door and brake controlling apparatus, the combination with a brake cylinder, a manually operable brake valve for controlling the supply and release of fluid under pressure to and from the brake cylinder, and a manually operable door valve for controlling the supply and release of fluid for opening and closing a car door, of a valve device controlling a communication through which fluid under pressure, supplied by operation of said door valve to open the car door, may be supplied to the brake cylinder, said valve device being operated upon a predetermined increase in the pressure of fluid supplied to the brake cylinder by operation of said brake valve device for positively closing said communication, and valve means operated by a predetermined increase in the pressure of fluid supplied through said communication to the brake cylinder for cutting off communication through which fluid under pressure is supplied from said brake valve device to the brake cylinder.

5. In a door and brake controlling equipment, the combination with a brake cylinder and manually controlled valve means for controlling the supply of fluid under pressure to the brake cylinder and the supply of fluid under pressure for effecting the opening of a car door, of a valve for controlling a communication through which fluid under pressure supplied in opening the car door may be supplied to the brake cylinder, a spring, and a pair of differential area pistons for operating said valve, one piston being subject to the pressure of fluid supplied through said communication to the brake cylinder and the other piston to the opposing pressures of said spring and the pressure of fluid supplied by said manually controlled valve means to the brake cylinder.

6. In a door and brake controlling equipment, the combination with a brake cylinder and manually controlled valve means for controlling the supply of fluid under pressure to the brake cylinder and the supply of fluid under pressure for effecting the opening of a car door, of a valve for controlling a communication through which fluid under pressure supplied in opening the car door may be supplied to the brake cylinder, a spring, and a pair of differential area pistons for operating said valve, one piston being subject to the pressure of fluid supplied through said communication to the brake cylinder and the other piston to the opposing pressures of said spring and the pressure of fluid supplied by said manually controlled valve means to the brake cylinder, and means for preventing the movement of said pistons from the position in which said valve is closed, so as to unseat said valve, unless the fluid pressure acting on said pistons is reduced to a degree substantially less than the fluid pressure required to move said pistons so as to permit said valve to seat.

7. In a door and brake controlling apparatus, the combination with a brake cylinder and means for opening and closing the doors, of a manually operable brake valve device for controlling the supply and release of fluid under pressure to and from the brake cylinder, means for controlling the means for opening and closing the doors, means responsive to operation of the last-named means and operable when said means is operated to effect the opening of the doors to supply fluid to a passage through which fluid under pressure may be supplied to the brake cylinder, valve means controlling communication through said passage, said valve means being operated upon a predetermined increase in the pressure of fluid supplied to the brake cylinder by operation of the brake valve device for closing said passage, and means for preventing the movement of the valve means to open said passage until the brake cylinder pressure has been reduced substantially below the pressure at which the valve means is moved to the closed position.

8. In a door and brake controlling apparatus, the combination with a brake cylinder and means for opening and closing the doors, of a manually operable brake valve device for controlling the supply and release of fluid under pressure to and from the brake cylinder, means for controlling the means for opening and closing the doors, means responsive to operation of the last named means and operable when said means is operated to effect the opening of the doors to supply fluid to a passage through which fluid under pressure may be supplied to the brake cylinder, valve means controlling communication through said passage, said valve means being operated upon a predetermined increase in the pressure of fluid supplied to the brake cylinder by operation of the brake valve device for closing said passage, means for preventing the movement of the valve means to open said passage until the brake cylinder pressure has been reduced substantially below the pressure at which the valve means is moved to the closed position, and means for preventing back flow of fluid from the brake cylinder to said passage.

9. In a door and brake controlling apparatus, the combination with a brake cylinder and means for opening and closing the doors, of a manually operable brake valve device for controlling the supply and release of fluid under pressure to and from the brake cylinder, means for controlling the means for opening and closing the doors, means responsive to operation of the last named means and operable when said means is operated to effect the opening of the doors to supply fluid to a passage through which fluid under pressure may be supplied to the brake cylinder, valve means controlling communication through said passage, said valve means being operated upon a predetermined increase in the pressure of fluid supplied to the brake cylinder by operation of the brake valve device for closing said passage, means for preventing the movement of the valve means to open said passage until the brake cylinder pressure has been reduced substantially below the pressure at which the valve means is moved to the closed position, and means operated upon an increase in the pressure of the fluid supplied to the brake cylinder through said passage for closing said passage.

GEORGE L. COTTER.